United States Patent [19]

Ermer et al.

[11] Patent Number: 4,539,972
[45] Date of Patent: Sep. 10, 1985

[54] METHOD FOR THE MULTIPLE LAP-CUTTING OF CRYSTAL BLOCKS WITH CONTINUOUS SHORTENING OF THE BLADE EXCURSION

[75] Inventors: Wolfgang Ermer, Hirten; Klemens Mühlbauer, Burgkirchen, both of Fed. Rep. of Germany

[73] Assignee: Heliotronic Forschungs-und Entwicklungsgesellshaft fur Solarzellen-Grundstoffe, Burghausen, Fed. Rep. of Germany

[21] Appl. No.: 520,338

[22] Filed: Aug. 4, 1983

[30] Foreign Application Priority Data

Dec. 23, 1982 [DE] Fed. Rep. of Germany ....... 3247826

[51] Int. Cl.³ .............................................. B28D 1/06
[52] U.S. Cl. .................................... 125/16 R; 83/751
[58] Field of Search .............. 125/16 R, 16 L; 83/751

[56] References Cited

U.S. PATENT DOCUMENTS 4,092,971  6/1978  Viscount ........................... 125/16 R

FOREIGN PATENT DOCUMENTS 1074 of 1871 United Kingdom ............. 125/16 R

Primary Examiner—Harold D. Whitehead
Attorney, Agent, or Firm—Burgess, Ryan & Wayne

[57] ABSTRACT

In the multiple lap-cutting of crystal blocks, the blade excursion is shortened continuously by a connection between the rotating drive crankhead and the connecting rod system which transmits the force to the gang saw which is moved toward the center of the drive crankhead during the sawing process.

6 Claims, 5 Drawing Figures

METHOD FOR THE MULTIPLE LAP-CUTTING OF CRYSTAL BLOCKS WITH CONTINUOUS SHORTENING OF THE BLADE EXCURSION

The present invention relates to a method for the multiple lap-cutting of mono- and polycrystalline crystal rods or blocks wherein a blade pack is held in a clamping frame executes, by means of a connecting rod system connecting the frame with a rotating drive crankhead, a lateral reciprocating movement, in a suspension of a lapping agent, through the workpiece to be cut.

BACKGROUND OF THE INVENTION

Gang saws and respective sawing methods for the multiple lap-cutting of mono- and polycrystalline rods or blocks of a semiconductor material such as silicon, germanium, gallium arsenide, indium phosphide, and oxidic material such as sapphire, quartz or gallium-gadolinium garnet are known (cf. e.g. DE-PS No. 20 39 699, DE-OS No. 27 57 132 or DE-OS No. 27 22 782). In all these methods, due to the irregular wear caused by the different stresses at the central and peripheral regions of the blades as they cut into the workpiece, the blades acquire a concave contour which becomes more and more pronounced with increasing sawing time. At the reversal points, this results in ever greater impact which stresses the workpiece during the sawing process and can lead to chipping and in the extreme case, to destruction of the workpiece. Heretofore, several ways have been tried to eliminate this problem.

It is known practice to glue lateral wedges, e.g., of silicon, for example, on silicon blocks which, as starting material for solar cells, are sawed to form square disks of 10 cm side length and about 300 to 600 microns thick. One obtains thereby, a workpiece which tapers with progressing sawing. Since at constant blade excursion, the actual operating length of the blade shortens continuously and the reversal point moves steadily toward the center of the blade, blade impact can be avoided almost completely. This method, of course, requires an additional step for gluing on the wedges. The production of the wedges is expensive and complicated since they must be shaped to fit.

In addition to these methods which shorten the operating length of the blades at constant blade excursion, it is known that the blade excursion itself can be shortened to avoid blade impact. Heretofore, however, continuous shortening of blade excursion has been described only for the rarely used hydraulically driven gang saws (cf. DE-OS No. 27 57 132) or for gang saws oscillating in a swinging spring system (cf. DE-OS No. 27 39 257), where it is difficult to maintain a precisely defined reversal point. In the conventional gang saws driven through a rotating drive crankhead with a connecting rod system, in which the reversal point is always exactly fixed, the machine must be stopped from time to time to shorten the excursion and by laboriously displacing by hand the connection of the connecting rod system at the crankhead. The duration of the sawing process is lengthened and the risk of damage to the workpiece as well as to the blades is increased by a repeated, necessary and complicated start-up of the apparatus.

BRIEF SUMMARY OF THE INVENTION

It was the object of the invention to provide a method for continuously adjusting blade excursion in conventionally driven gang saws during the sawing operation, thereby avoiding the disadvantages inherent in the known methods.

The blade excursion is continuously shortened by a method which is characterized by a device in which the connection between the drive crankhead and the connecting rod system is continuously moved toward the center of the crankhead during the sawing operation.

Gang saws for carrying out the method of the invention are characterized in that a rotatable eccentric stud is provided as a movable connection between the drive crankhead and the connecting rod system, or a linearly displaceable crank stud is provided as a movable connection between the drive crankhead and the connecting rod system.

BRIEF DESCRIPTION OF THE DRAWINGS

Embodiments of the invention are illustrated in FIGS. 1, 2, 3, and 4. For clarity, only the drive crankhead with the respective embodiment of the movable connection to the connecting rod system is illustrated, since, as a rule, only this part need be changed from the state of the art known for gang saws to carry out the method of the invention.

DETAILED DESCRIPTION OF THE INVENTION

Figure 1:
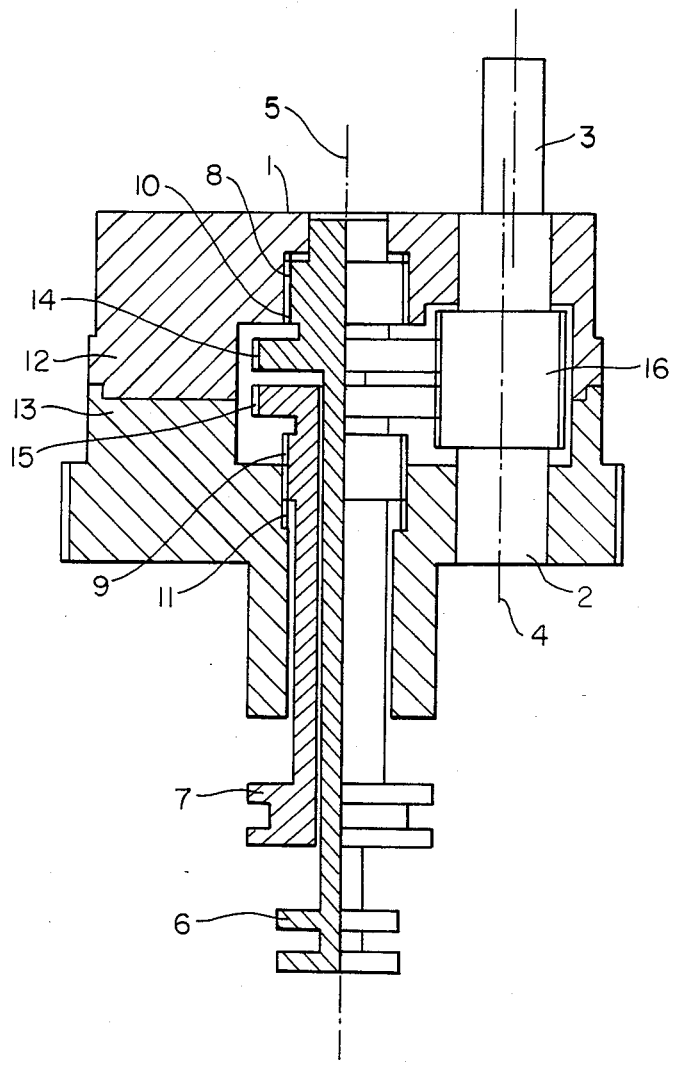
FIG. 1 illustrates an embodiment of a drive crankhead where the connection to the connecting rod system is established by a crank pin fitted on a rotatable eccentric stud.

FIG. 1 shows schematically, in cross section, a drive crankhead 1 with a rotatable eccentric stud 2 which terminates in a crank pin 3 which is coupled to the connecting rod system 100 for transmission of force to the saw frame 200. By rotation of the eccentric stud about its axis of rotation 4, the distance of the crank pin from the axis of rotation 5 of the drive crankhead can be varied; the excursion of the saw frame connected therewith through the connecting rod system will also change accordingly.

The rotation of the eccentric stud can be achieved in the following manner: in the center of the crankhead, two shifting means 6 and 7 are displaceably mounted parallel to the axis of rotation. The shifting means are arranged concentrically, one in the other. Both shifting means are provided with a helical gear 8, 9, which is fitted into corresponding helical internal gears 10, 11 of the lower and upper crankhead halves 12, 13, respectively. If one moves the two shifting means up or down, they are caused to rotate because of the movement of the helical gears in the helical internal gearing. The rotation is transmitted by the spur gears 14, 15 on the shifting means to the spur gear 16 surrounding the eccentric stud thereby causing the eccentric stud to rotate. Expediently, the parameters, as for example the amount of translation of the shifting means, slant of the helical gears, eccentricity of the eccentric stud, and the like are arranged to provide a shortening of the blade excursion by about 0.5% to 10% of the maximum blade excursion.

Drive members suitable for the movement of the shifting means such as electric motors, are advantageously designed to be controllable. The rotation of the eccentric stud can be adapted depending on the workpiece to be cut and the cutting speed, to position the crank pin to provide as large as possible blade excursion at the beginning of the sawing operation, but as small as possible blade excursion at the end of the sawing operation. Upon completion of the sawing process, the blade pack is usually repositioned and the shifting means can easily be brought back to the starting position during that time. It has been found desirable to interlock the two shifting means to ensure movement of the eccentric stud without play.

Figure 2:
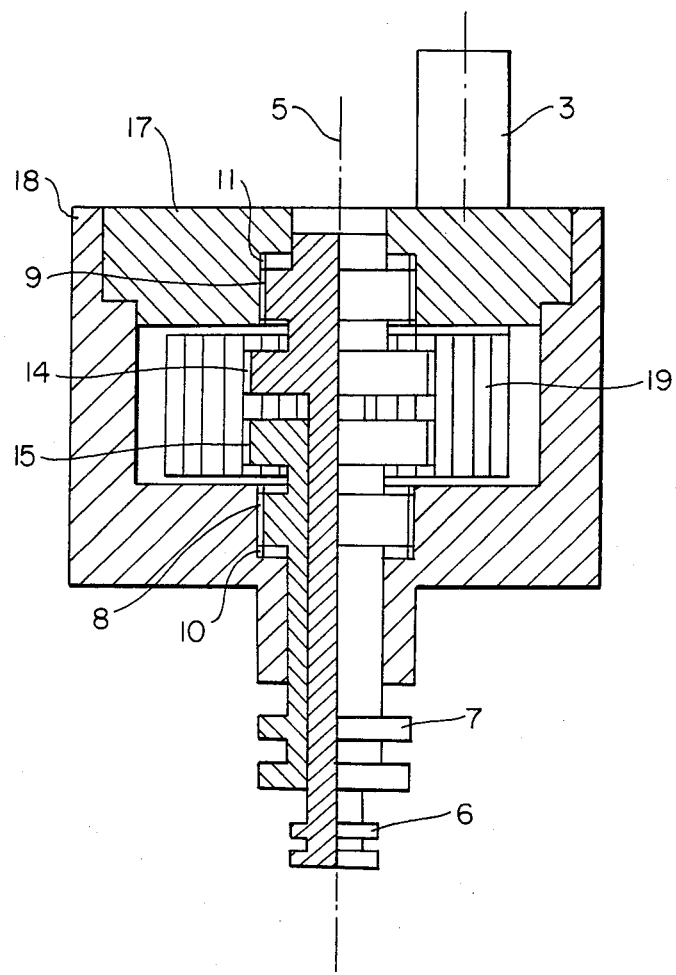
FIG. 2 illustrates an embodiment of a drive crankhead with a linearly displaceable crank stud which moves from the outside inwardly on a straight line leading through or past the center of the crankhead.

FIG. 2 shows schematically a cross-section of a drive crankhead where the connection to the connecting rod system (not shown for reasons of clearer representation) is made through a linearly displaceable crank stud. Corresponding structural elements are numbered in FIG. 2 as in FIG. 1. The drive crankhead 1 consists of the two parts 17 and 18 connected together, e.g., screwed together. In the center of the crankhead, two shifting means 6 and 7, displaceable parallel to the axis of rotation are arranged concentrically one in the other. Both shifting means are provided with a helical gear 8, 9, fitted into corresponding helical internal gears 10, 11 of the upper and lower parts 17, 18, of the crankhead. By joint upward or downward displacement, the shifting means are caused to rotate. By means of the two spur gears 14, and 15, the rotation of the shifting means causes a translatory movement of the rack 19 in contact with the spur gears. Movement of the rack 19 changes the position of the crank stud 3, firmly connected with the rack, relative to the axis of rotation 5 of the drive crankhead and thereby changes the blade excursion.

In principle, it is possible to form the helical gears 8, 9 as well as the internal gearing 10, 11 as spur gears. The rotational or translatory movement is then obtained through helical gearing of rack 19 and of the gear wheels 14 and 15. Also, a helical tooth system of all gear members can be useful, in which case, the gears 9, 8, and 14, 15 must be cut with helical gearing in opposite directions. Such embodiments can also be used in the arrangement shown in FIG. 1.

Preferably, the shifting means are interlocked, to ensure movement of the rack without play and to provide exactly fixed reversal point. The up or down movement of the shifting means can be achieved through threaded spindles or racks driven by controllable electric motors, but other drive means such as hydraulic, mechanical or pneumatic can be used. These shifting means drive can also be applied to the arrangement described in FIG. 1.

Figure 3:
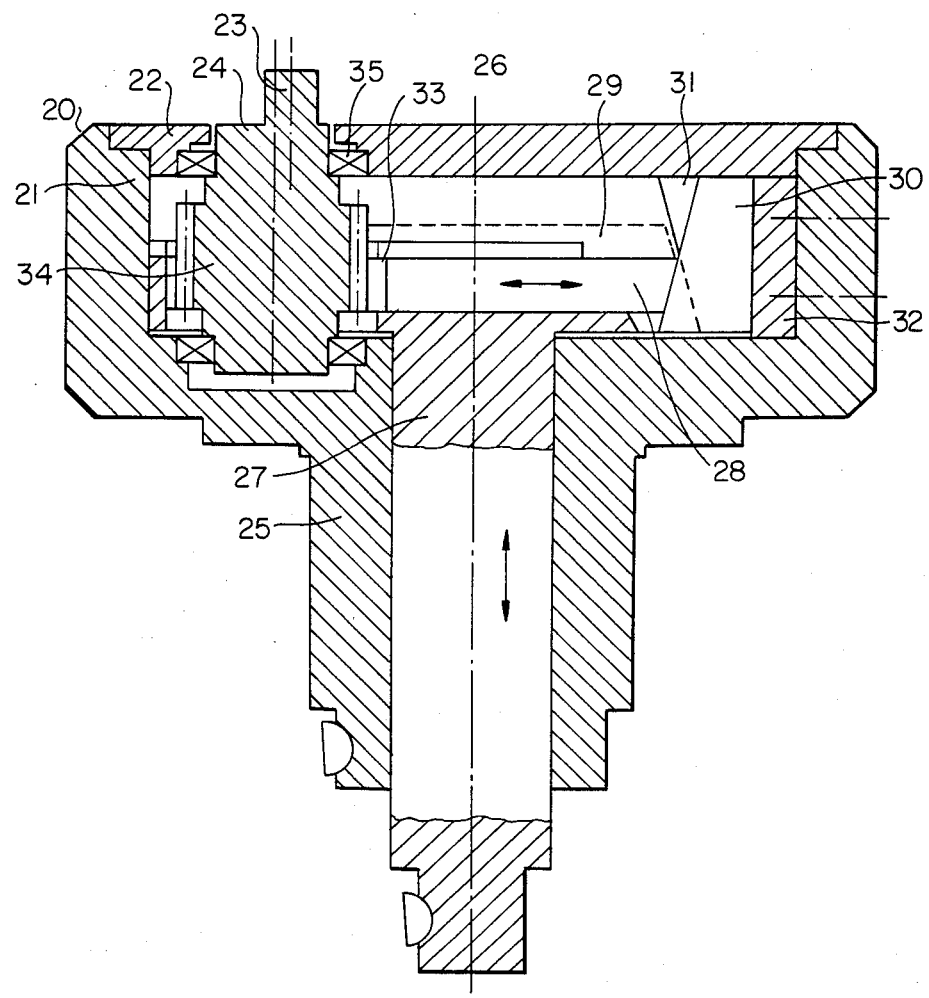
FIGS. 3 and 4 illustrate additional embodiments of a drive crankhead with a rotatable eccentric stud.

In the arrangement shown schematically in FIG. 3, similarly to the drive crankhead in FIG. 1, the shortening of the excursion of the saw blades is brought about by rotation of an eccentric stud which changes the distance of a crank stud to which the connecting rod system (not shown) is attached, from the axis of rotation of the drive crankhead. The rotation, however, is obtained, not by a vertical movement parallel to the axis of rotation of the drive crankhead of two shifting means disposed in the center thereof, but according to another principle. All parts of the drive crankhead shown in FIG. 3 are renumbered, although some of them are also component parts of the crankheads according to FIG. 1 or FIG. 2.

The drive crankhead 20 consists of the crankhead base 21 and the crankhead top 22, which is provided with an opening for the crank pin 23 and eccentric stud 24. In the center of the crankhead shank 25 is a push rod 27 which moves parallel to the axis of rotation 26 of the drive crankhead and which carries laterally at its upper end, a pair of parallel and opposite transverse push rods 28 and 29 moving perpendicularly to the direction of movement of push rod 27. For the sake of clarity, the transverse push rod 29 is indicated only by broken lines. Both transverse push rods are bevelled at one end and slide by their oblique surfaces along the correspondingly bevelled end faces of the wedges 30 and 31 (broken lines). Both wedges are prepositioned by holders relative to the transverse push rods; but for reasons of clearer representation, only the holder 32 which prepositions wedge 30 relative to transverse push rod 28 is shown. The angles at which the wedges or respectively, the ends of the transverse push rods are bevelled, are chosen so that they complement each other to 180°. Both transverse push rods have at the ends, away from their bevelled ends, a spur gear zone 33, by which, opposite each other, they engage the part of the eccentric stud formed as spur gear 34.

When push rod 27 is moved up, the transverse push rod 29 is moved by the sliding motion of its oblique end along wedge 31 in the direction of the eccentric stud. This transverse movement transmits through the spur gear to the eccentric stud held by the bearings 35, e.g., ball, sliding or needle bearings, causing it to rotate. At the same time, this rotary movement moves the transverse push rod 28 against the wedge 30, on the oblique surface of which it slides upward by its bevelled end. By the pre-stress of the two transverse push rods and wedges relative to each other, rotation of the eccentric stud can occur without play.

Figure 4:
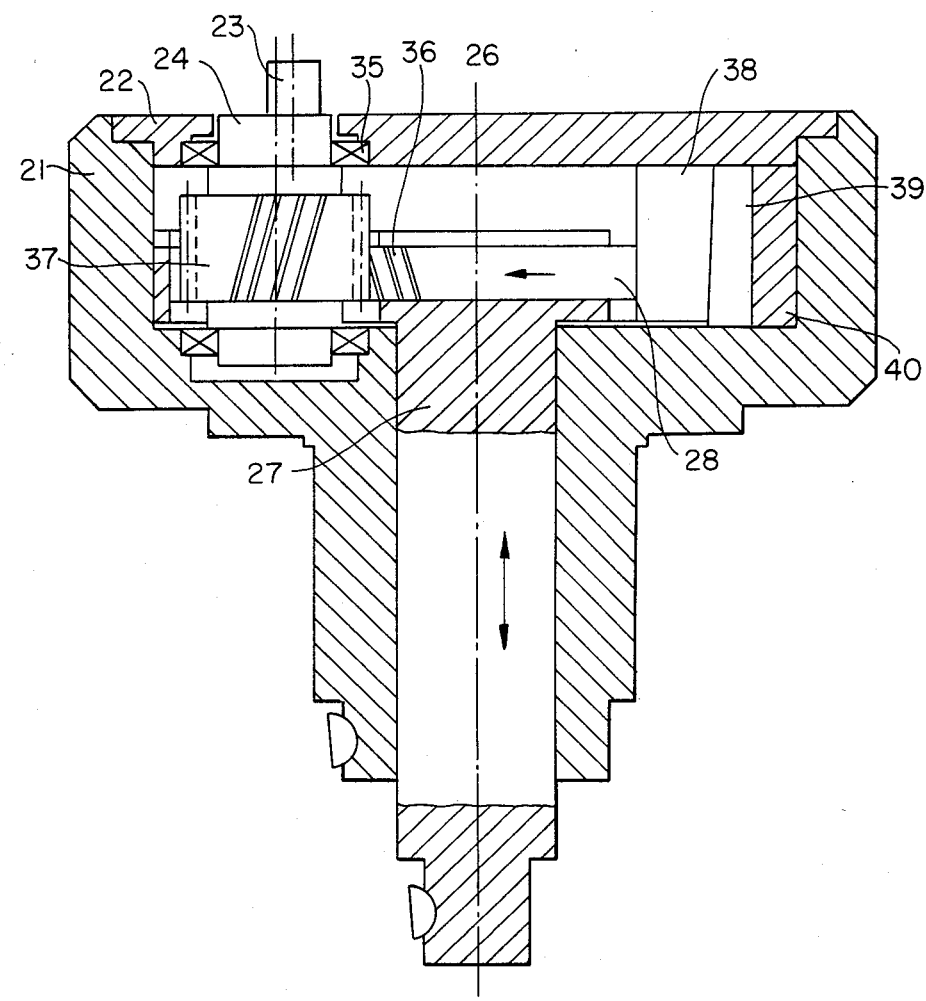
Figure 5:
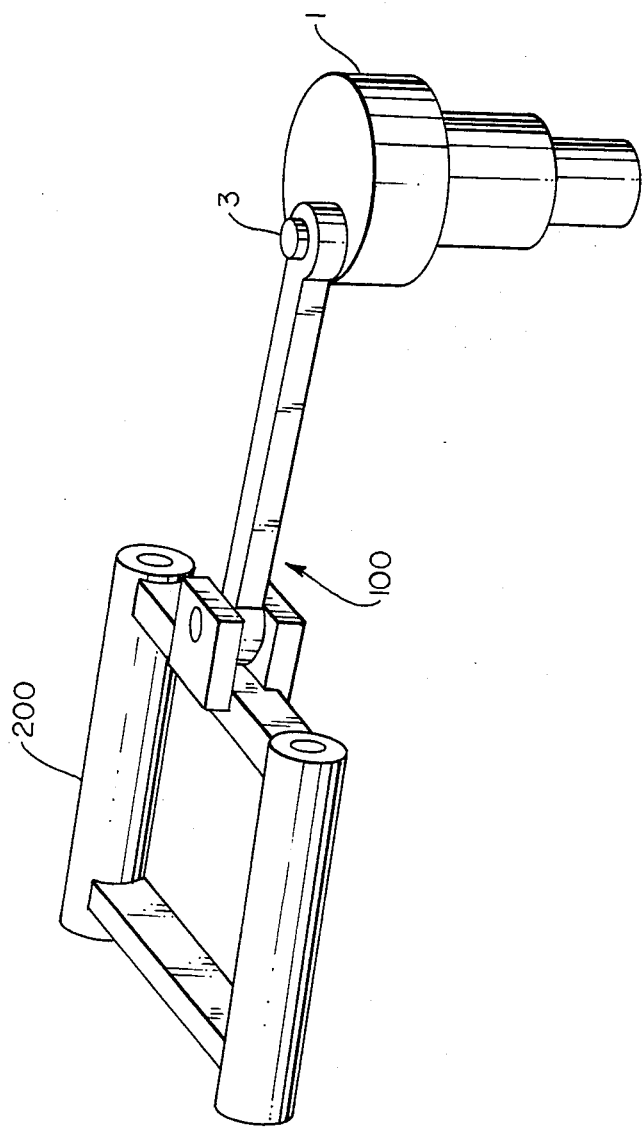
FIG. 5 is a schematic perspective view illustrating the connection of a drive crank head according to the present invention to a saw clamp frame through a connecting rod system.

The embodiment of a vertically movable push rod, which carries at its upper end two mutually opposite and parallel transverse push rods, is shown in the arrangement illustrated in FIG. 4. For greater clarity, only one transverse push rod is shown; corresponding parts are numbered as in FIG. 3.

The rotation of the eccentric stud 24 is obtained in this case by helical gearing 36 of the transverse push rod 28 and of the second transverse push rod (not shown) which engages with the eccentric stud part formed as a helical gear 37. An upward movement of push rod 27, and the transverse push rods with their helical gears, which can be achieved through hydraulic, pneumatic, mechanical or electrical drive means, brings about rotation of the gear 37. The eccentric stud 24 rotates and gradually changes the distance of the crank stud from the axis of rotation of the drive crankhead. The transverse push rod 28 can be prepositioned relative to gear 37 by the sliding wedge 38, the supporting wedge 39 and the abutment 40. For this purpose, it is desirable to bevel the contacting surfaces of the sliding and of the supporting wedges. Also, the second transverse push rod (not shown) is prepositioned relative to gear 37 by an identically constructed system (not shown) consisting of a sliding wedge, supporting wedge and abutment. It is thus possible to ensure a rotation without play of the eccentric stud and accordingly, a continuous shortening of the blade excursion of the gang saw.

The embodiments of the invention here presented by way of example, serve only to explain, not to limit, the inventive idea. They make it possible in a simple manner to shorten the blade excursion continuously in gang saws during the sawing process. By such a shortening of the excursion during sawing, which may as a rule amount to 0.5% to 10%, preferably 4% to 8% of the maximum blade excursion, a distinct improvement of the disk quality is achieved in less time than in the conventional methods.

What we claim is:

1. A method for the multiple lap-cutting of monocrystalline and polycrystalline rods or blocks, comprising the steps of:

providing a connecting rod system for connecting a cylindrical crank pin having a longitudinal axis, of a rotating drive crankhead to a clamping frame having a blade pack held in the frame, so that rotation of the crank pin about a central axis of the crankhead parallel to the longitudinal axis of the crank pin causes lateral reciprocating movement of the clamping frame and blade pack in a suspension of a lapping agent through a workpiece to be cut, the length of each cutting stroke of the blade pack related to the distance between the longitudinal axis of the crank pin and the central axis of the crankhead;

rotating the crankhead about the central axis thereof to cause the crank pin to circumscribe said central axis so that the blade pack undergoes said lateral reciprocating movement; and continuously decreasing the distance between the longitudinal axis of the crank pin and the central axis of the crankhead, so as to continuously shorten the cutting stroke of the blade pack during the cutting operation.

2. A method for the multiple lap-cutting of monocrystalline and polycrystalline rods or blocks of claim 1, comprising the steps of:

providing a connecting rod system for connecting a cylindrical crank pin having a longitudinal axis of a rotating drive crankhead to a clamping frame having a blade pack held in the frame, so that rotation of the crank pin about a central axis of the crankhead parallel to the longitudinal axis of the crank pin causes lateral reciprocating movement of the clamping frame and blade pack in a suspension of a lapping agent through a workpiece to be cut, the length of each cutting stroke of the blade pack related to the distance between the longitudinal axis of the crank pin and the central axis of the crankhead;

rotating the crankhead about the central axis thereof to cause the crank pin to circumscribe said central axis so that the blade pack undergoes said lateral reciprocating movement; and simultaneously rotating the crank pin about a second axis of the crankhead displaced from and parallel to the longitudinal axis of the crank pin, to continuously decrease the distance between the longitudinal axis of the crank pin and the central axis of the crankhead, so as to continuously shorten the cutting stroke of the blade pack during the cutting operation.

3. The method according to claim 1, wherein the crankhead includes a shifting means which, when moved longitudinally along the central axis of the crankhead, causes displacement of the longitudinal axis of the crank pin in relation to the central axis of the crankhead, comprising the additional step of:

continuously moving the shifting means longitudinally with respect to the crankhead, by an amount corresponding to the desired decrease in the cutting stroke of the blade pack.

4. The method according to claim 1, wherein the crankhead includes a shifting means which, when moved longitudinally along the central axis of the crankhead, rotates with respect to the crankhead to cause displacement of the longitudinal axis of the crank pin in relation to the central axis of the crankhead comprising the additional step of:

continuously moving the shifting means longitudinally with respect to the crankhead, by an amount corresponding to the desired decrease in the cutting stroke of the blade pack.

5. The method according to claim 1, wherein the crankhead includes a shifting means which, when moved longitudinally along the central axis of the crankhead, rotates with respect to the crankhead to cause rotation of the crank pin about the second axis, comprising the additional step of:

continuously moving the shifting means longitudinally with respect to the crankhead, by an amount corresponding to the desired decrease in the cutting stroke of the blade pack.

6. The method according to claim 1, wherein the crankhead includes a shifting means which, when moved longitudinally along the central axis of the crankhead, causes rotation of the crank pin about the second axis, comprising the additional step of:

continuously moving the shifting means longitudinally with respect to the crankhead, by an amount corresponding to the desired decrease in the cutting stroke of the blade pack.

* * * * *